US011365879B2

(12) United States Patent
Leblanc et al.

(10) Patent No.: US 11,365,879 B2
(45) Date of Patent: Jun. 21, 2022

(54) STREETLIGHT CAMERA

(71) Applicant: CONTROLE DE DONNEES METROPOLIS INC., Repentigny (CA)

(72) Inventors: Normand Leblanc, Repentigny (CA); Dany Lapointe, Boisbriand (CA)

(*) Notice: Subject to any disclaimer, the term of this patent is extended or adjusted under 35 U.S.C. 154(b) by 0 days.

(21) Appl. No.: 17/270,106

(22) PCT Filed: Sep. 6, 2019

(86) PCT No.: PCT/CA2019/051252
§ 371 (c)(1),
(2) Date: Feb. 22, 2021

(87) PCT Pub. No.: WO2020/047673
PCT Pub. Date: Mar. 12, 2020

(65) Prior Publication Data
US 2021/0180784 A1 Jun. 17, 2021

Related U.S. Application Data

(60) Provisional application No. 62/728,279, filed on Sep. 7, 2018.

(51) Int. Cl.
*F21V 33/00* (2006.01)
*H04W 4/029* (2018.01)
(Continued)

(52) U.S. Cl.
CPC .......... *F21V 33/0052* (2013.01); *F21S 8/086* (2013.01); *H04N 5/2252* (2013.01);
(Continued)

(58) Field of Classification Search
CPC .................. F21V 33/0052; H04N 5/2254; H04N 5/2252; F21S 8/086; F21W 2131/103; H04W 4/12
See application file for complete search history.

(56) References Cited

U.S. PATENT DOCUMENTS 8,188,878 B2 5/2012 Pederson et al.
8,382,387 B1 2/2013 Sandoval
(Continued)

FOREIGN PATENT DOCUMENTS

CN 203980116 U 12/2014
CN 204631439 U 9/2015
(Continued)

OTHER PUBLICATIONS

International application No. PCT/CA2019/051252 International Preliminary Report on Patentability Chapter II dated Nov. 25, 2020.
(Continued)

*Primary Examiner* — Mulugeta Mengesha
*Assistant Examiner* — Timothy R Newlin
(74) *Attorney, Agent, or Firm* — Anglehart et al.

(57) ABSTRACT

A camera can have a mounting socket configured to connect to a photodetector switch port of a streetlight for mechanically supporting a housing, a power supply receiving power from the port and an optical image sensor and lens arrangement mounted in the camera housing. A camera can have an optical image sensor and lens arrangement, a memory unit to store optical image data and a microcontroller unit to process optical image data. The camera can use a wireless network communications interface to communicate the optical image data by forming a network among similar wireless network communications interfaces from neighboring streetlight cameras.

20 Claims, 12 Drawing Sheets

(51) Int. Cl.
*F21S 8/08* (2006.01)
*H04N 5/225* (2006.01)
*H04W 4/12* (2009.01)
*F21W 131/103* (2006.01)

(52) U.S. Cl.
CPC .......... *H04N 5/2254* (2013.01); *H04W 4/029* (2018.02); *H04W 4/12* (2013.01); *F21W 2131/103* (2013.01)

(56) References Cited

U.S. PATENT DOCUMENTS

| | | | |
|---|---|---|---|
| 8,558,413 B1* | 10/2013 | Lepard | F21V 33/0052 307/150 |
| 8,588,942 B2 | 11/2013 | Agrawal | |
| 8,698,272 B2 | 4/2014 | Vineis et al. | |
| 9,575,394 B1* | 2/2017 | Wallace | H04N 5/247 |
| 10,438,049 B2* | 10/2019 | Sotodate | G06K 9/00295 |
| 2008/0175216 A1* | 7/2008 | Nasco | F21S 8/081 370/338 |
| 2009/0046449 A1* | 2/2009 | Li | F21S 8/086 362/153.1 |
| 2010/0134046 A1* | 6/2010 | Holder | F21V 19/04 315/297 |
| 2011/0141727 A1* | 6/2011 | Kim | F21V 33/00 362/234 |
| 2012/0143383 A1* | 6/2012 | Cooperrider | H02J 13/0079 700/295 |
| 2012/0154521 A1* | 6/2012 | Townsend | H04N 5/247 348/36 |
| 2012/0217880 A1 | 8/2012 | Nieuwlands et al. | |
| 2013/0107041 A1 | 5/2013 | Norem et al. | |
| 2013/0300290 A1* | 11/2013 | Holland | H05B 47/11 315/113 |
| 2013/0335574 A1* | 12/2013 | Ishida | H05B 47/115 348/159 |
| 2014/0300276 A1* | 10/2014 | Wang | H05B 47/19 315/151 |
| 2015/0222112 A1* | 8/2015 | Wallace | H02H 1/0061 361/90 |
| 2015/0362172 A1 | 12/2015 | Gabriel et al. | |
| 2016/0125246 A1* | 5/2016 | Ryhorchuk | H04N 5/23206 348/143 |
| 2017/0041535 A1* | 2/2017 | Nguyen | G03B 15/03 |
| 2017/0114986 A1* | 4/2017 | Girouard | F21V 3/00 |
| 2017/0161915 A1* | 6/2017 | Walma | F21V 33/0052 |
| 2017/0301220 A1 | 10/2017 | Jarrell et al. | |
| 2017/0336061 A1 | 11/2017 | Riedel et al. | |
| 2017/0358315 A1* | 12/2017 | Saha | H04R 1/406 |
| 2018/0045388 A1* | 2/2018 | McDowell | H02G 1/00 |
| 2018/0063429 A1* | 3/2018 | Enriquez | G03B 17/08 |
| 2018/0087760 A1* | 3/2018 | Clynne | F21V 23/0471 |
| 2018/0114438 A1* | 4/2018 | Rajagopalan | H05B 47/115 |
| 2018/0192033 A1* | 7/2018 | Gallup | H04N 13/243 |
| 2018/0288860 A1* | 10/2018 | Vendetti | H05B 47/19 |
| 2018/0331757 A1* | 11/2018 | Breuer | H04B 10/40 |
| 2019/0243217 A1* | 8/2019 | Park | H04N 13/243 |
| 2019/0323702 A1* | 10/2019 | Adejumo | G08B 13/1966 |

FOREIGN PATENT DOCUMENTS

| | | |
|---|---|---|
| WO | 2014/111752 A1 | 7/2014 |
| WO | 2017/210791 A1 | 12/2017 |

OTHER PUBLICATIONS

International application No. PCT/CA2019/051252 International Preliminary Report on Patentability Chapter I dated Dec. 5, 2019.
International application No. PCT/CA2019/051252 International Search Report dated Dec. 5, 2019.
International application No. PCT/CA2019/051252 Search Strategy dated Dec. 5, 2019.
Corresponding Colombia patent application No. NC2021/0004118 Office Action dated Oct. 11, 2021, the translation of the main examination opinion is provided.
European application No. 19858118.3 the extended European search report dated Mar. 25, 2022.

* cited by examiner

STREETLIGHT CAMERA

CROSS-REFERENCE TO RELATED APPLICATIONS

This application claims priority from U.S. Provisional Patent Application 62/728,279 filed Sep. 7, 2018, the specification of which is incorporated herein by reference.

TECHNICAL FIELD

The present application relates to a streetlight camera for use with a streetlight.

BACKGROUND OF THE INVENTION

The present invention relates to a camera device that provides, simultaneously, remote lightning control of a streetlight, remote surveillance of an area surrounding the streetlight, and wireless communication networking to an area surrounding the streetlight. The camera device of the present invention may be used in populated or urban areas, for example in city centre streets, neighborhood streets, highways, parking areas, industrial areas, crime hotspots, etc. In the camera device of the present invention, one or more camera sensors provide a video output of a ground level area surrounding a streetlight to a remotely-located and network-connected control room via a web interface. The camera may be static, to always view the same area, and may be disposed in such a way as to provide a panoramic imagery of a ground level area surrounding a streetlight. Light of a streetlight upon which the camera device of the present invention is attached may be remotely adjusted by turning on or off the streetlight or by increasing or decreasing the light intensity level of the streetlight. Attachment of the camera device of the present invention to the streetlight is provided by a socket adapted to the streetlight's photodetector switch port.

Surveillance cameras and wireless communication network relays are currently attached to poles and similar urban and utility structures in populated areas by use of various housings. However, the prominence of the location of these devices makes them easy prey to vandalism, to hacking or to avoidance of detection, making the installations ineffective. A solution to the problem of concealing the camera and networking equipment, making it covert despite illumination, and bringing it out-of-reach, would be to reduce the form factor of the equipment to a few inches of size, to carry it on a streetlight, and to create a fixture that is small, mechanically robust, electrically universal, streetlight compatible, and designed to contain all the equipment, which would provide the needed space for the camera, power supply, and communication equipment.

An effective system requires at least a suitable power supply to provide the voltage used by the camera and wireless network equipment, a wireless modem system to transmit the images, and a camera with remote control capabilities. U.S. Pat. No. 2015/0362172 A1 issued to W. Gabriel provides an apparatus and method embedding a camera in a modified LED streetlight housing that includes a compartment with a camera that can receive light from an area beneath the streetlight, that passers-by do not see. Also, U.S. Pat. No. 8,382,387 issued to S. C. Sandoval provides a cobra-style streetlight housing for accepting a surveillance camera, positioned within a modified streetlight housing, so that the camera may collect image data through a camouflaged lens. If the problem of designing a new streetlight housing that can provide all the space needed to contain all the components needed for an effective surveillance and network system did not include the restraint that the streetlight housing be of a limited or pre-established size or shape, then the solution would be rather easy: simply make a modified and larger streetlight housing. However, changing all streetlight fixtures to integrate the camera and networking functions is a solution that is prohibitively expensive and difficult to implement rapidly at reasonable cost.

U.S. Pat. No. 8,188,878 issued to J. C. Pederson provides an LED light and communication system comprising at least one optical transceiver, a light support having a plurality of light emitting diodes and at least one photodetector attached thereto, the light emitting diodes receiving power from a power source. This system is streetlight compatible and uses free-space optical communications to relay the data. However, the performance of such a system may be strongly affected by the occurrence of bad weather and dirt commonly affecting streetlights. U.S. Pat. No. 8,698,272 issued to W. G. Bartholomay provides for systems, devices, and methods for managing multimedia traffic across a common wireless communication network. Embodiments may have application functions transmitting and receiving application data streams including a video application. However, no teaching is provided on how to implement these functions to streetlights or similar urban and utility structures.

Accordingly, there remains a need for a simple, remote-controllable, and reliable approach at incorporating all of the camera and network functions needed for an effective surveillance system into a streetlight, and thus providing such a streetlight camera surveillance device without having to re-design and replace the entire streetlight housing. The disclosed invention uses much of a well-known, universal, widely available streetlight fixture that is the basis for creating a streetlight camera device that provides, simultaneously, remote lightning control of a streetlight, remote surveillance of an area surrounding the streetlight, and wireless communication networking to an area surrounding the streetlight.

SUMMARY

In this disclosure, there is provided a streetlight camera for use with a streetlight of the type having a photodetector switch port on a housing of said streetlight, the streetlight camera comprising a mounting socket configured to connect to said port for mechanically supporting said streetlight camera; a power supply receiving power from photodetector switch port of said streetlight; at least one optical image sensor and lens arrangement; a camera housing connected to said mounting socket for supporting said at least one optical image sensor and lens arrangement to provide at least one field of view of a ground level area proximal to the streetlight; a memory unit to store optical image data from said at least one optical image sensor; a microcontroller unit to process optical image data; a network connection interface to communicate said optical image data; a registry comprising the geolocation data of said streetlight; and a message manager adapted to receive an incoming message via the network connection interface and to handle the incoming message in accordance with a content of the incoming message and the registry, wherein, upon receipt of an incoming message, the microcontroller unit is adapted to retrieve processed optical image data from the memory unit and send optical image data through the network connection interface.

DETAILED DESCRIPTION

In this disclosure, there is provided a streetlight camera for use with a streetlight of the type having a photodetector switch port on a housing of said streetlight, the streetlight camera comprising: a camera housing; a mounting socket configured to connect to said port for mechanically supporting said housing; a power supply for receiving power from photodetector switch port of said streetlight; and at least one optical image sensor and lens arrangement mounted in said camera housing.

Figure 1:
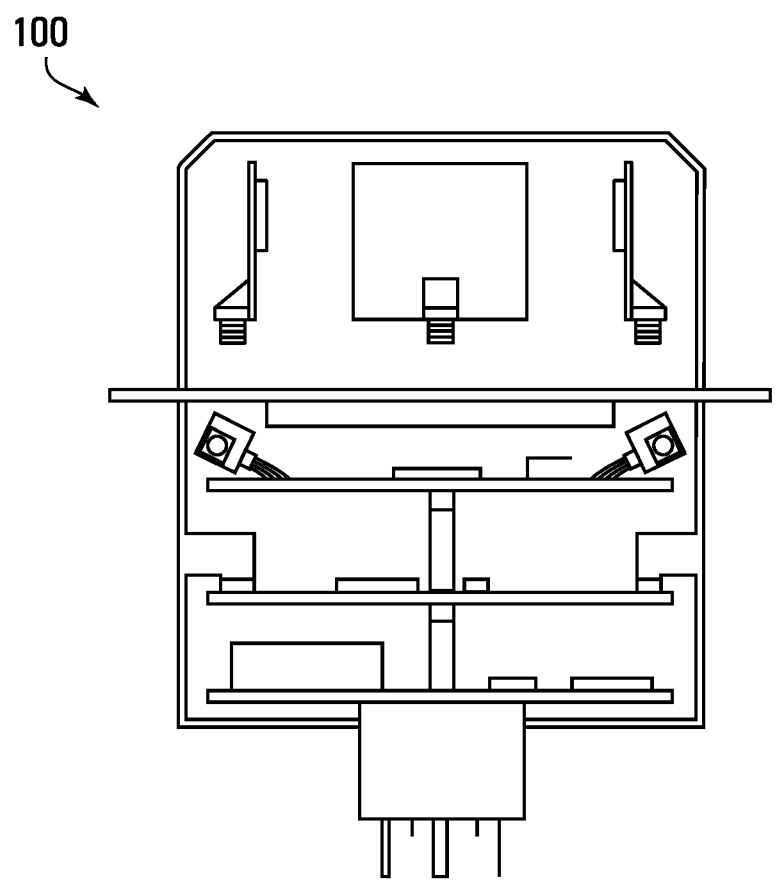
FIG. 1: Streetlight camera [100] of the present invention (cross-section view).

Referring to FIG. 1, there is illustrated said streetlight camera 100 as provided in an exemplary embodiment. As used herein, the term 'streetlight' is intended to refer to a light pole, a lamppost, a street lamp, a light standard, or a lamp standard that is a raised source of light on the edge of a roadway or pathway. Also, as used herein, the term 'camera' is an optical instrument for recording or capturing images, which may be stored locally or transmitted to another location; the images may be individual still photographs or sequences of images constituting videos or movies.

Figure 2:
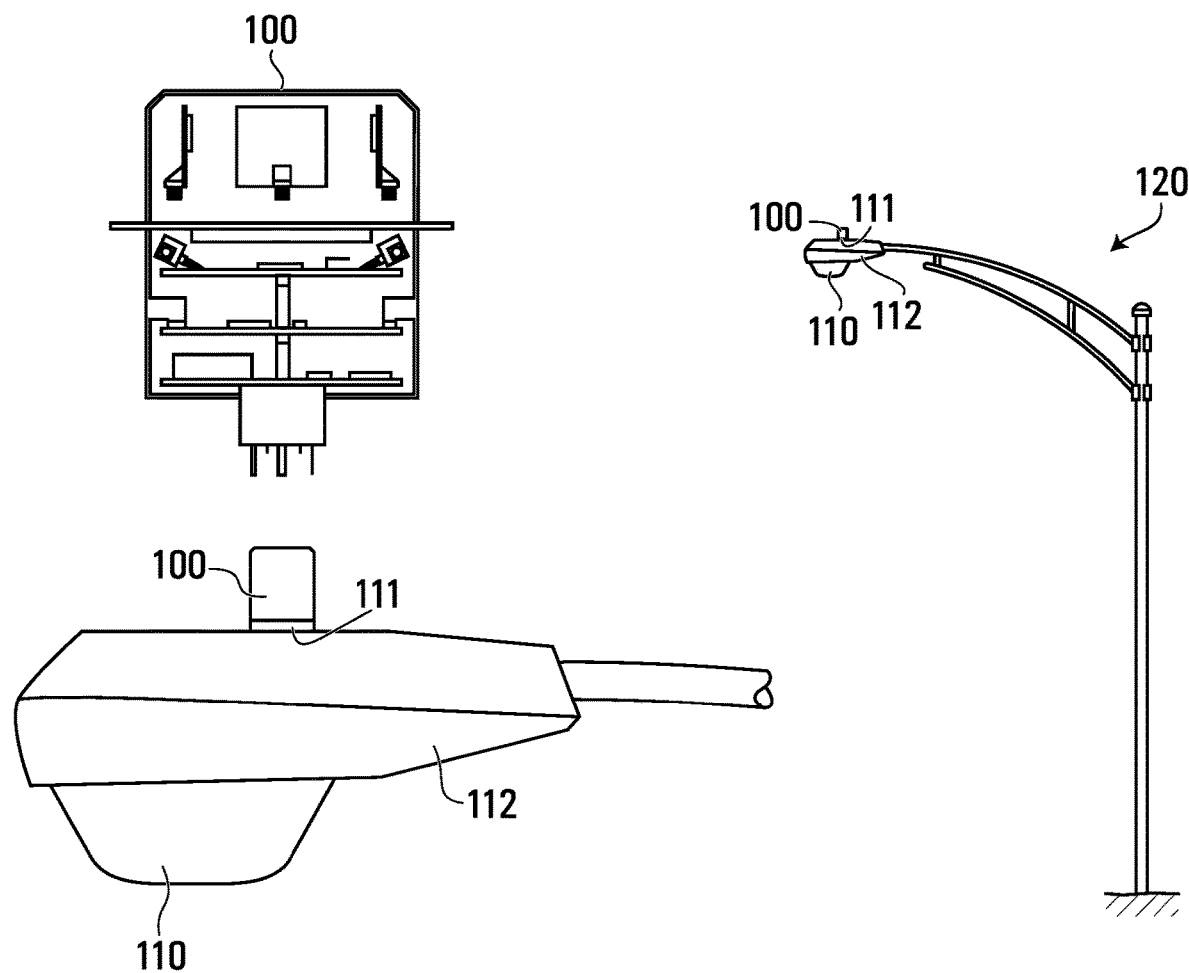
FIG. 2: Streetlight camera 100 of the present invention (cross-section view), wherein said streetlight camera is for use with a streetlight 110 of the type having a photodetector switch port 111 on the housing 112 of said streetlight.

Referring to FIGS. 1 and 2, in accordance with an embodiment, the streetlight camera 100 is for use with a streetlight 110 of the type having a photodetector switch port 111 on the housing 112 of said streetlight. As used herein, the term 'switch port' is intended to refer to a terminal that connects two devices together and that incorporates a signal routing functionality. Said photodetector switch port 111 further comprises a mounting socket configured to connect said streetlight camera 100 to said port 111 for mechanically supporting and electrically connecting said streetlight camera. In accordance with some embodiments, said photodetector switch port 111 may have a mounting socket configured to be located on the top, bottom or side parts of the streetlight 110. As used herein, the term 'mounting socket' is intended to refer to an electrical terminal used to connect to a power source onto which another device can be plugged or screwed in. In an embodiment, the mounting socket may be a twist-lock type socket to mechanically support and electrically connect said streetlight camera 100 to said photodetector switch port 111. In an embodiment, the housing 112 of the streetlight may correspond to a LED cobra head street light.

Figure 3:
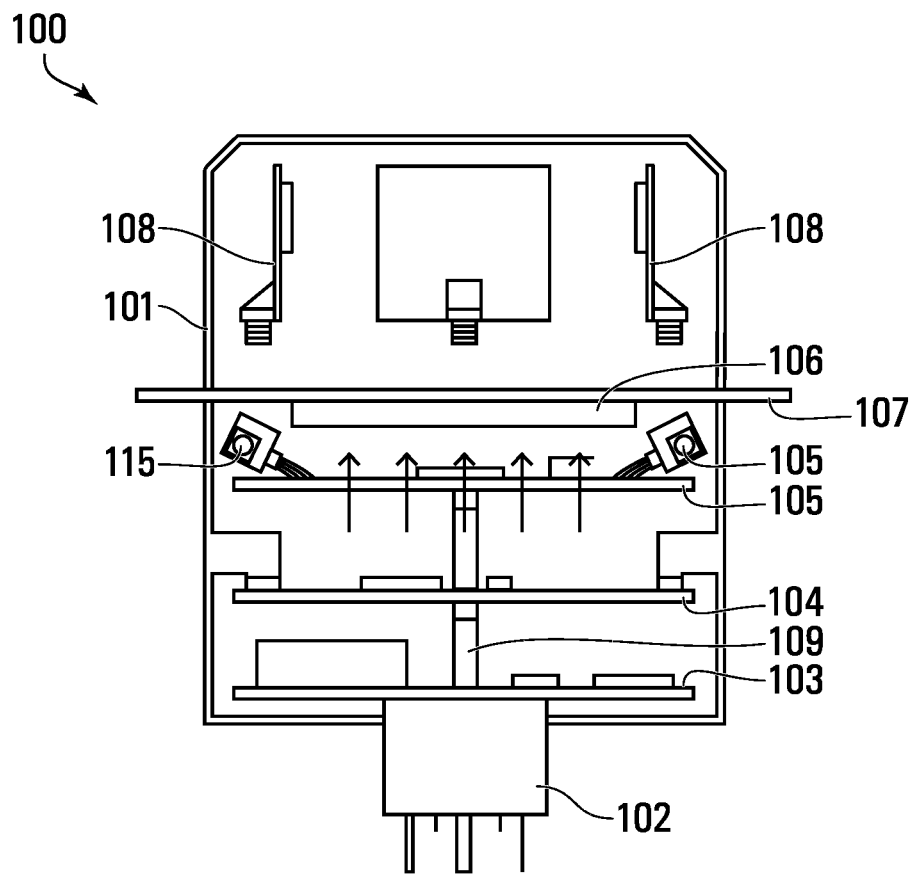
FIG. 3: Streetlight camera [100] of the present invention (cross-section view), comprising an optically-transparent camera housing [101], an electrical connection to the photodetector switch port [102], a power-supply electronic board [103], a micro-processor electronic board [104], an image sensor electronic board [105] comprising at least one optical image sensor and lens arrangement [115] [125], a temperature-control board [106], a heatsink [107], an antenna electronic board [108], and a common connection shaft [109].

Referring to FIG. 3, there is illustrated a streetlight camera 100 as provided in an exemplary embodiment. The streetlight camera 100 comprises an optically-transparent camera housing 101, an electrical connection 102 to the photodetector switch port 111, a power-supply electronic board 103, a micro-processor electronic board 104, an image sensor electronic board 105 comprising at least one optical image sensor and lens arrangement 115 125, a temperature-control board 106, a heatsink 107, an antenna electronic board 108, and a common connection shaft 109. Said optically-transparent camera housing 101 may provide from 10% to 100% optical transparency in visible light. As used herein, the term 'optical image sensor' is intended to refer to a light sensor that detects and conveys the digital information that constitutes an optical image.

Referring to FIGS. 2 and 3, said power-supply electronic board 103 may comprise a switch for controlling the on/off operation and light intensity level of the streetlight 110, wherein said switch may be actuated by a light detector arranged in said camera housing 101 for detecting daylight, or may be actuated by firmware program aboard the micro-processor electronic board 104, or a combination thereof.

Still referring to FIGS. 2 and 3, there is illustrated a streetlight camera 100 as provided in an exemplary embodiment, wherein the camera housing 101 is connected, through the electrical connection 102, to the mounting socket of the photodetector switch port 111 of said streetlight 110. Said electrical connection 102 provides mechanical support and electrical connection of said streetlight camera 100 to said mounting socket of the photodetector switch port 111. Said camera housing 101 is connected to said mounting socket for supporting said at least one optical image sensor and lens arrangement 115 125 to provide at least one field of view of a ground level area proximal to the streetlight 120. In an embodiment, the ground level area 120 may be 5 to 30 meters below the streetlight camera 100 and may extend 100 meters sideways.

Figure 4:
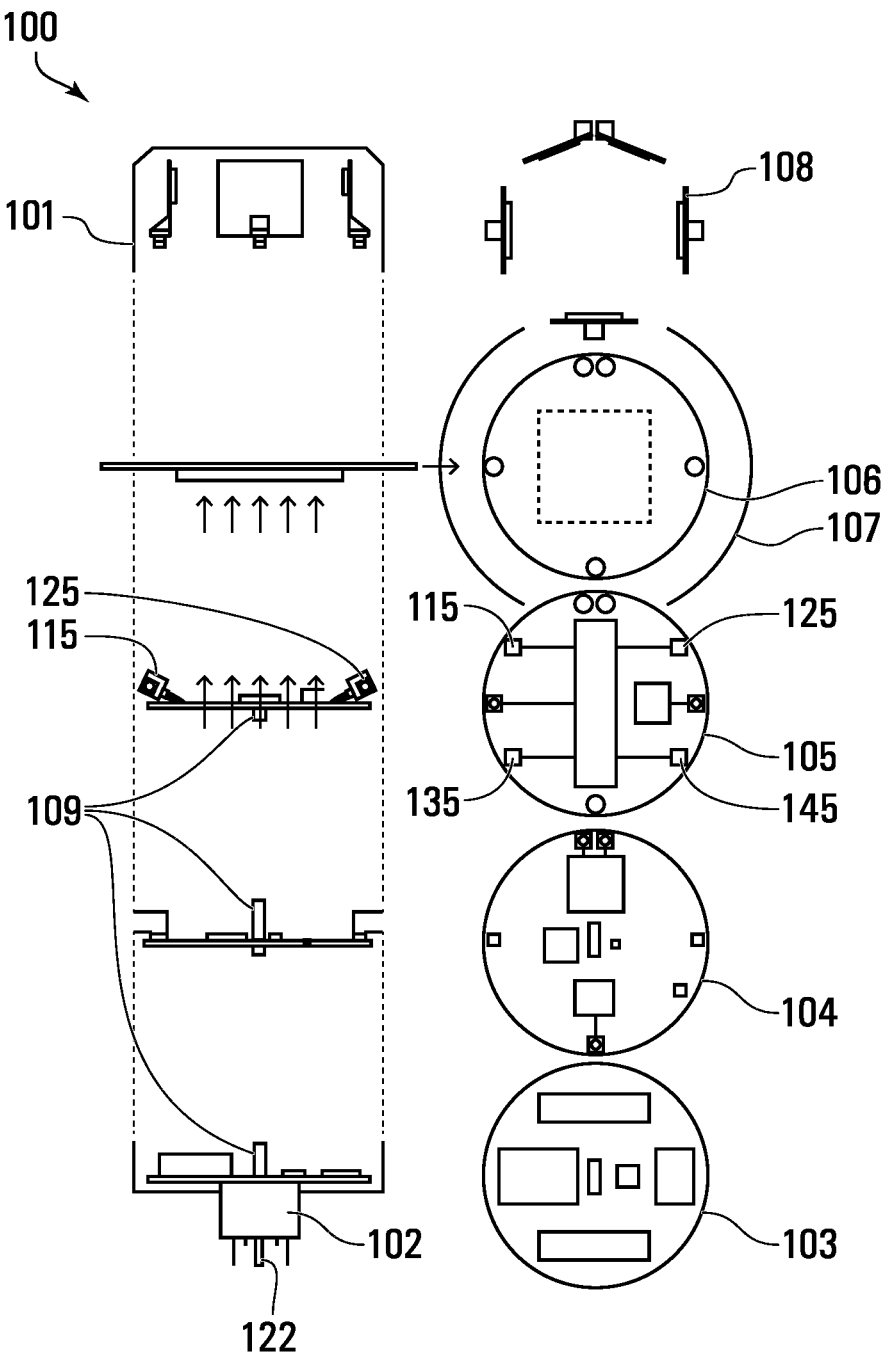
FIG. 4: Streetlight camera [100] of the present invention (vertical expansion and top-view), comprising an optically-transparent camera housing [101], an electrical connection [102], a power-supply electronic board [103], a microprocessor electronic board [104], an image sensor electronic board [105] comprising an arrangement of optical image sensors [115] [125] [135] [145], a temperature-control board [106], a heatsink [107], an antenna electronic board [108], and a common connection shaft [109].
Figure 5:
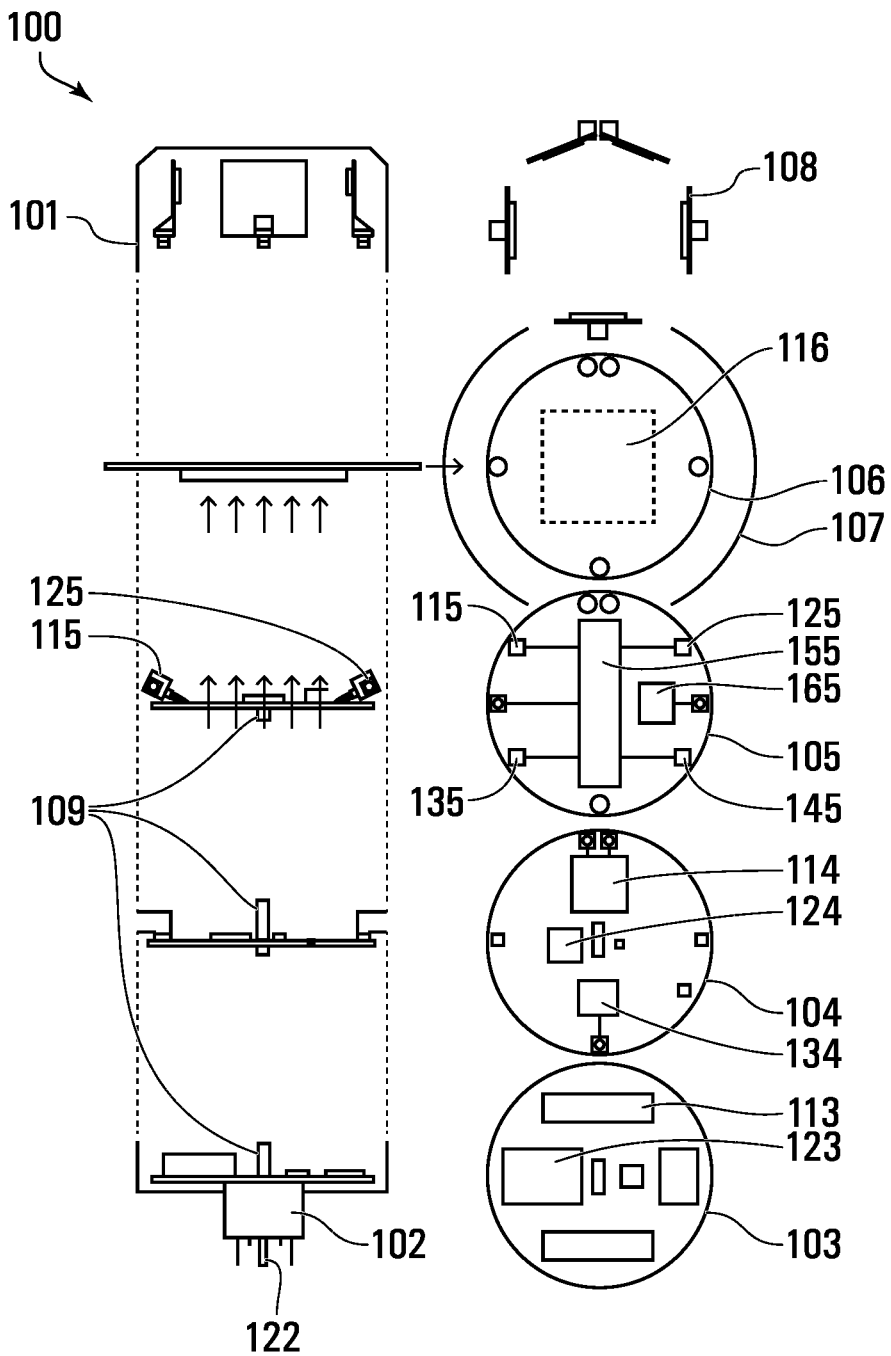
FIG. 5: Streetlight camera [100] of the present invention (vertical expansion and top-view), further comprising an optically-transparent camera housing [101], an electrical connection [102], a power-supply electronic board [103], a micro-processor electronic board [104], an image sensor electronic board [105] comprising an arrangement of optical image sensors [115] [125] [135] [145], a temperature-control board [106], a heatsink [107], an antenna electronic board [108], and a common connection shaft [109].
Figure 6:
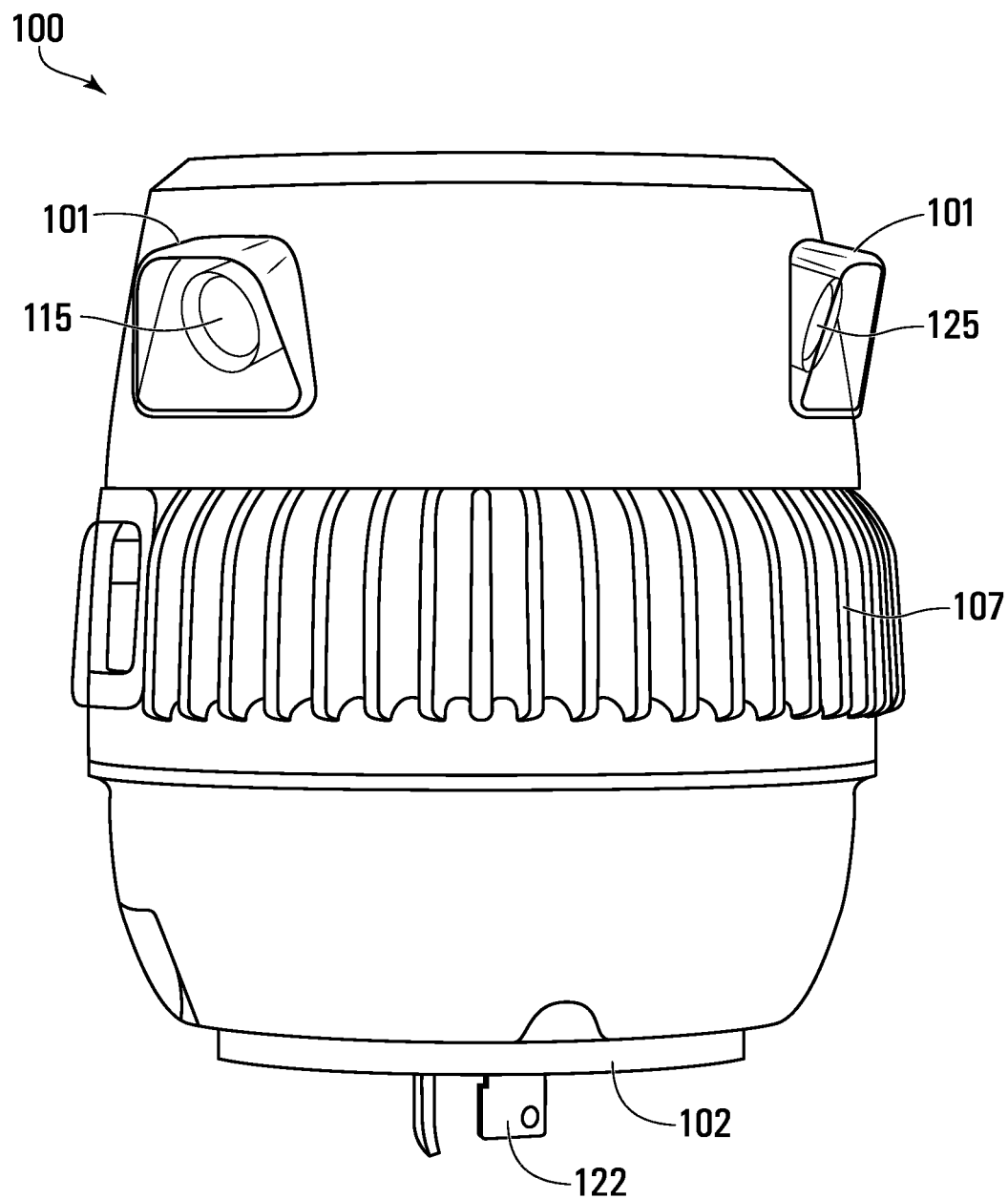
FIG. 6: Streetlight camera [100] of the present invention (external view), comprising a camera housing [101] optically-transparent proximal to the optical image sensors [115] [125], an electrical connection [102] adapted to a feed voltage ranging from 110 volts to 280 volts, and may feature a multi-pin NEMA connector [122] that can be adapted to a twist-lock type socket in order to mechanically support and electrically connect the streetlight camera to the photodetector switch port, and a heatsink [107].
Figure 7:
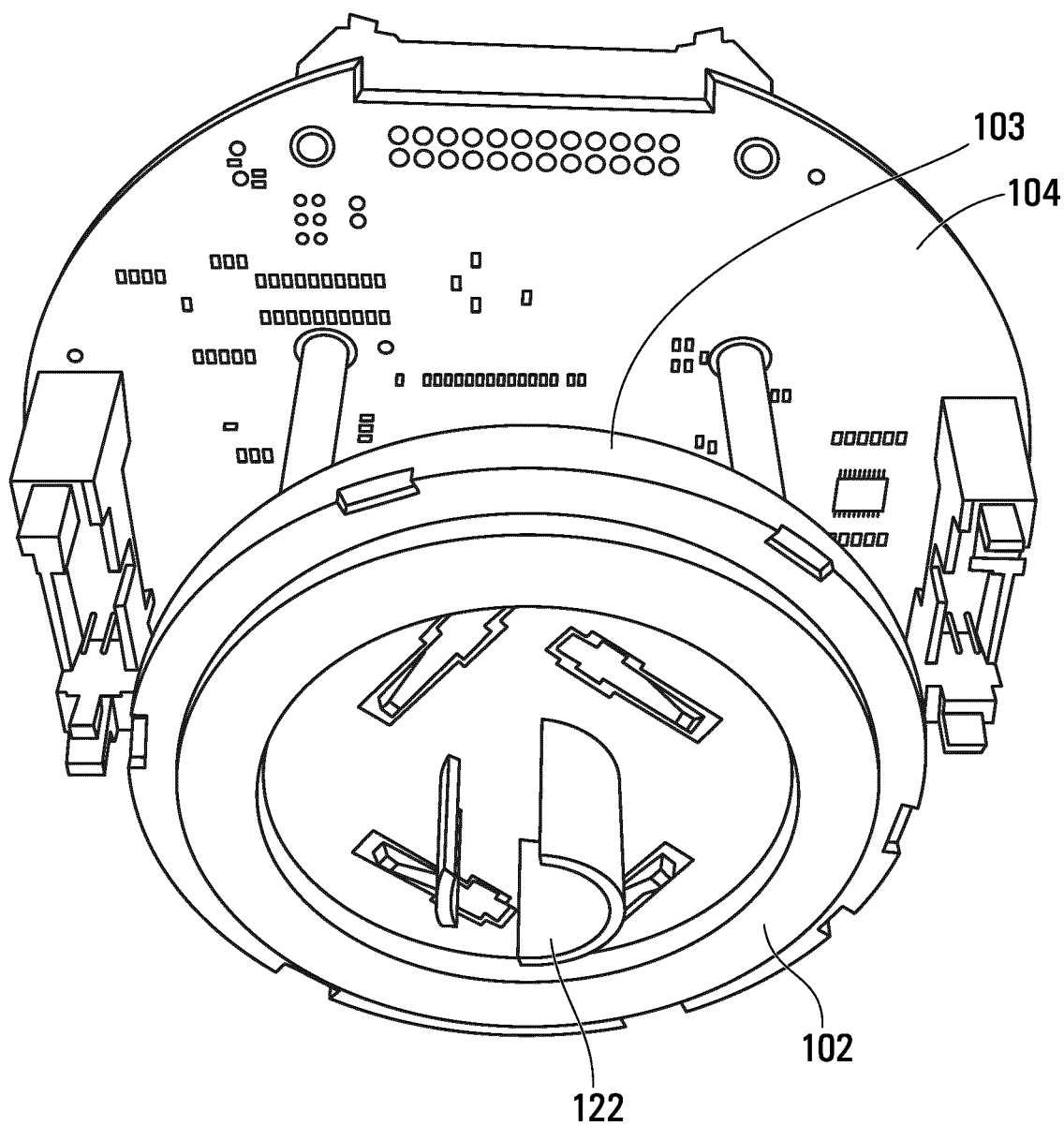
FIG. 7: The streetlight camera of the present invention (bottom view) may comprise an electrical connection [102] adapted to a feed voltage ranging from 110 volts to 280 volts, and may feature a 7-pin NEMA connector [122] that can be adapted to a twist-lock type socket in order to mechanically support and electrically connect the streetlight camera to the photodetector switch port.
Figure 8:
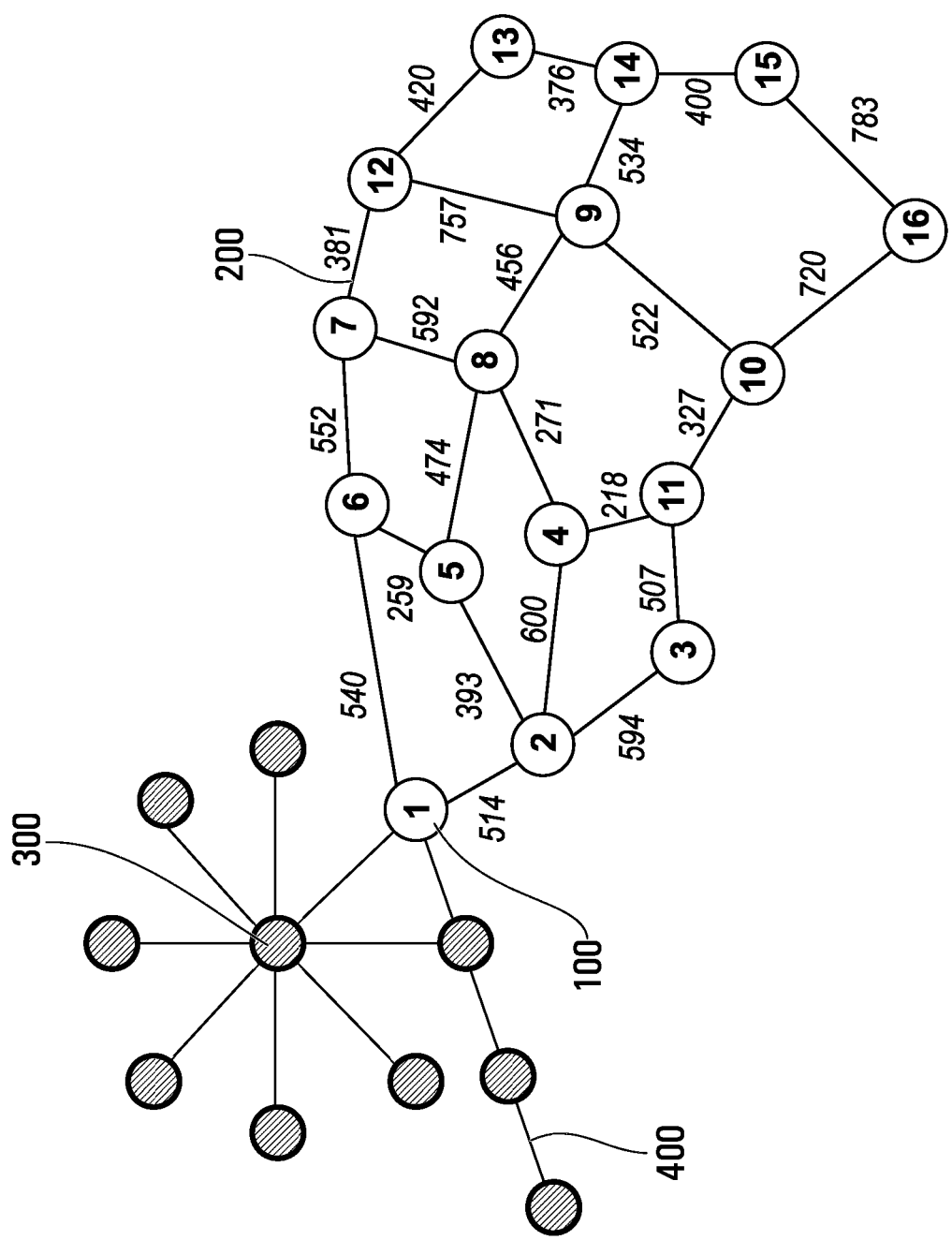
FIG. 8: Streetlight cameras of the present invention (numbered from 1 to 16), wherein said streetlight cameras form physical nodes coincident simultaneously with the nodes of at least three wireless communications networks of different topologies. In this embodiment, streetlight camera numbered 1 [100] forms a physical node coincident simultaneously with one of the nodes of a mesh wireless network [200], with one of the nodes of a star wireless network [300], and with one of the nodes of a line wireless network [400].
Figure 9:
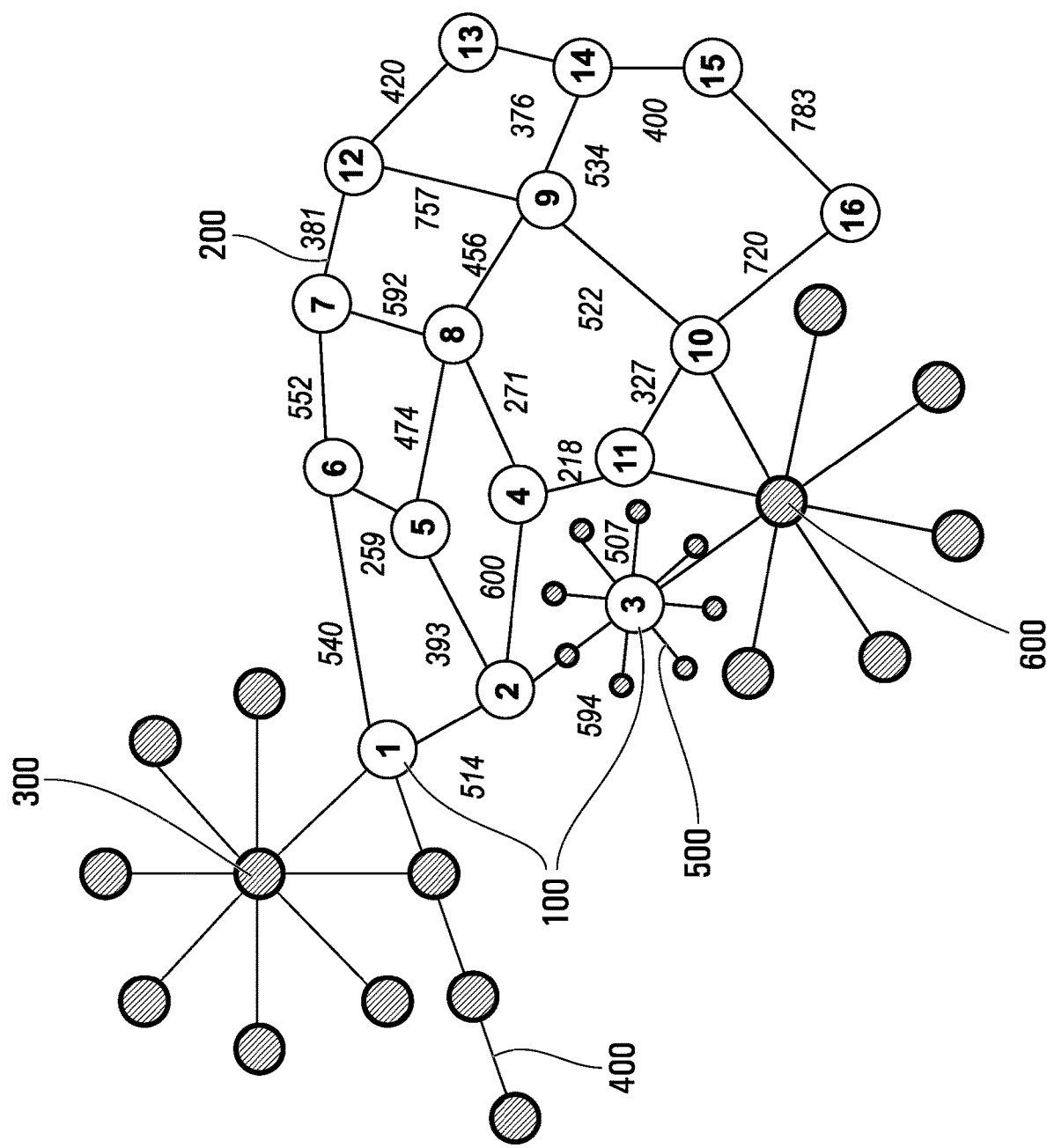
FIG. 9: Streetlight cameras of the present invention (numbered from 1 to 16), wherein said streetlight cameras form physical nodes coincident simultaneously with the nodes of a plurality of wireless communications networks of different topologies. In this embodiment, streetlight camera numbered 1 [100] forms a physical node coincident simultaneously with one of the nodes of a mesh wireless network [200], with one of the nodes of a star wireless network [300], and with one of the nodes of a line wireless network [400]; and streetlight camera numbered 3 [100] forms a physical node coincident simultaneously with one of the nodes of a mesh wireless network [200], with one of the nodes of a local-area star wireless network [500], and with one of the nodes of a wide-area star wireless network [600].

Referring to FIGS. 3, 4 and 5, there is illustrated a streetlight camera 100 as provided in an exemplary embodiment. The streetlight camera 100, the camera housing 101, and the electronic boards 103 104 105 106 may be substantially cylindrical in shape, with a diameter ranging from 1 cm to 20 cm, a height ranging from 1 cm to 30 cm, and with the common connection shaft 109 substantially located at the geometrical axis of the cylinder shape. In other embodiments, the streetlight camera 100, the camera housing 101, and the electronic boards 103 104 105 106 may be substantially square, rectangular, elongated or conical in shape, with the common connection shaft 109 substantially located at the geometrical axis of said streetlight camera 100. The electrical connection 102 substantially aligns with the common connection shaft 109 and provides a balanced mechanical support of said streetlight camera 100 to said mounting socket of the photodetector switch port 111.

Referring to FIGS. 2 to 7, there is illustrated a streetlight camera 100 as provided in an exemplary embodiment. The streetlight camera 100 may comprise an electrical connection 102 adapted to a feed voltage ranging from 110 volts to 280 volts, and may feature a 7-pin NEMA connector 122 that can be adapted to a twist-lock type socket in order to mechanically support and electrically connect said streetlight camera 100 to said photodetector switch port 111. A twist-lock type socket provides the necessary mechanical robustness, physical balance, and electrical stability to withstand various vibration, wind, humidity, impact, weather and dirt conditions occurring at the streetlight. As used herein, NEMA connectors refer to power plugs and receptacles used for AC mains electricity in North America and other countries that use the standards set by the US National Electrical Manufacturers Association. NEMA wiring devices may be made in current ratings from 15 to 60 amperes (A), with voltage ratings from 110 to 600 volts (V). Different combinations of contact blade widths, shapes, orientation, and dimensions may create non-interchangeable connectors that are unique for each combination of voltage, electric current carrying capacity, and grounding system. Twist-locking connectors use curved blades in order to be adapted to a twist-lock type socket. Once pushed into the receptacle, the plug 122 may be twisted and its now-rotated blades latch into the receptacle 111. To unlatch the plug, the rotation is reversed. The locking coupling makes for a more reliable connection in urban and industrial settings, where vibration or incidental impact could disconnect a non-locking connector. The streetlight camera 100 may further comprise a power-supply electronic board 103 comprising an arrangement of current-voltage-power sensing modules 123, light dimming and on-off control modules 113, heater modules, and other modules adapted to control, adjust or read various streetlight status data and various streetlight camera status data.

Referring to FIGS. 3, 4 and 5, there is illustrated a streetlight camera 100 as provided in an exemplary embodiment. The streetlight camera 100 may comprise a micro-processor electronic board 104 comprising various components for controlling the electronic circuitry within the streetlight camera 100 and within the housing of the streetlight 112. In one embodiment, said micro-processor electronic board 104 may comprise a microcontroller integrated circuit 124 that may consist of one of STMicroelectronics' proprietary microcontrollers, such as the STM32 32-bit microcontroller integrated circuit, consisting of a processor core, a static RAM memory, a flash memory, a debugging interface, and various electronics peripherals integrated into the same chip. As used herein, the terms 'micro-processor' and 'microcontroller' are intended to refer to small electronic computing devices integrated into single integrated circuits, having processing and controlling functionalities, respectively. The micro-processor electronic board 104 may further comprise a Global Positioning System (GPS) sensor 134 for providing geolocation and time information. In accordance with an embodiment, the micro-processor electronic board 104 may further comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

Still referring to FIGS. 3, 4 and 5, said micro-processor electronic board 104 may further comprise a network connection interface 114 consisting of a wireless data communications interface adapted to send and receive communication data. Said network connection interface 114 may comprise wireless or wired network connection interfaces, or a combination thereof. Said network connection interface 114 may be adapted to transmitting and receiving different wireless radio frequencies within the range of frequencies from 0.8 to 6 GHz. In one embodiment, said network connection interface 114 may be adapted to IEEE 802.11 technical standard for media access control and physical layer specifications for implementing wireless local area network (WLAN) computer communication in the 900 MHz and 2.4, 3.6, 5, 5.8, and 6 GHz radio frequency bands. In another embodiment, said network connection interface 114 may be adapted to IEEE 802.15.4 technical standard for media access control and physical layer specifications for implementing low-rate wireless personal area networks (LR-WPANs) computer communication in the 900 MHz and 2.4 GHz radio frequency bands. In another embodiment, said network connection interface 114 may be adapted to both IEEE 802.11 and IEEE 802.15.4 technical standards. In another embodiment, said network connection interface 114 may be adapted to the Ethernet family of computer networking technologies commonly used in local area networks (LAN). Said network connection interface 114 may comprise radio emitters and receivers in the 900 MHz and 2.4, 3.6, 5, 5.8, and 6 GHz radio frequency bands integrated within the micro-processor electronic board 104. Said network connection interface 114 may be adapted to send to the network the optical image data from the at least one optical image sensor and lens arrangement 115 125 135 145 of the image sensor electronic board 105, and may be adapted to receive data from wireless or wired networks. Examples of wireless connections are wireless networks, such as personal area networks (PAN), local area networks (LAN), mesh networks, metropolitan area networks (MAN), wide area networks (WAN), and cellular networks. In some embodiments, said network connection interface 114 may be adapted to a wireless network of any one of WiFi, Bluetooth, UWB, LoRa, LTE, cellular, satellite, or other wireless networks or a combination thereof. The communication may be one-way, i.e. from the streetlight camera 100 to the network, or two-way, in all cases by way of the network connection interface 114. The communication range may vary as a function of the type of network connection. For example, it may range from a few meters using high-frequency communications links, such as WiFi or ultra-wide band (UWB) radio links, to several kilometers using low-frequency communications links, such as 915 MHz radio links or LoRa radio links. Methods and devices for extending the communication range may also be used.

In one embodiment, said network connection interface 114 is adapted to form a network among similar said network connection interface from neighboring streetlight cameras. Such network may comprise 915 MHz long-range radio links for communicating the operation status data (light output, power levels, sensor data, etc.) of every neighboring streetlights, and may comprise UWB daisy-chained short-range radio links for communicating video streaming data of every neighboring streetlights, and may comprise 4G-LTE cellular gateway radio links for communicating data to an IP network. In one embodiment, said 4G-LTE cellular gateway radio link may consist of a ZTE embedded cellular wireless modem for communicating data to a cellular network.

Still referring to FIGS. 3, 4 and 5, there is illustrated a streetlight camera 100 as provided in an exemplary embodiment. The streetlight camera 100 may comprise an image sensor electronic board 105 comprising at least one optical image sensor and lens arrangement 115 125 135 145. Said image sensor electronic board 105 may comprise video image sensors, or infrared image sensors, or photo-detecting sensors, or a combination thereof. Said lens arrangement may comprise narrow field, or wide field, or panoramic, or zoom optical lens assemblies to provide at least one field of view of a ground level area proximal to the streetlight. In one embodiment, said at least one optical image sensor and lens arrangement 115 125 135 145 may be one or a combination of Freescale Semiconductor's iMX series proprietary image sensors, such as iMX214 (13Mpx resolution) or iMX298 (16Mpx resolution) or iMX318 (22Mpx resolution). Said image sensor electronic board 105 may further comprise an applications processor 155 to process the raw optical image data from said at least one optical image sensor. In one embodiment, said applications processor 155 may be one of Freescale Semiconductor's iMX series proprietary microcontrollers for multimedia applications, such as iMX6 or iMX8 that integrates many processing units into one chip, like a CPU, a video processing unit and a graphics processing unit (GPU). In one embodiment, said applications processor 155 may be one of Broadcom's more energy-efficient ARM Cortex-A53 proprietary microcontrollers.

Said image sensor electronic board 105 may further comprise a memory unit 165 to store raw or processed optical image data from said at least one optical image sensor. In one embodiment, said memory unit 165 may be a 256 GB solid-state hard drive (SSD). Said memory unit 165 may comprise any suitable known or other machine-readable storage medium, including non-transitory computer readable storage medium, for example, but not limited to, an electronic, magnetic, optical, electromagnetic, infrared, or semiconductor system, apparatus, or device, or any suitable combination of the foregoing. The memory unit 165 may include a suitable combination of any type of computer memory that is located internally or externally to the streetlight camera 100, for example random-access memory (RAM), read-only memory (ROM), flash memory (FLASH), solid-state card driver memory (SD), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. In one embodiment, said memory unit 165 may be an external computer memory referring to Cloud data storage. Said memory unit 165 may comprise any storage means suitable for retrievably storing machine-readable instructions executable by the applications processor 155 or the microcontroller integrated circuit 124. In some embodiments, said image sensor electronic board 105 may further include other electronics components such as audio sensors, microphones or other multimedia electronics components or a combination thereof.

The micro-processor electronic board 104 and the image sensor electronic board 105 may further comprise environmental sensors for determining temperature, relative humidity, atmospheric pressure, concentrations of air pollutants, IR-Vis-UV light intensities, noise intensity, or any other environmental factors proximal to the streetlight. The microprocessor electronic board 104 and the image sensor electronic board 105 may further comprise inertial sensors such as 3-axis accelerometers, magnetometers and angular inclination sensors for determining the verticality of the streetlight.

The micro-processor electronic board 104 or the image sensor electronic board 105 may further comprise a subscriber identity module or subscriber identification module (SIM), widely known as a SIM card, which refers to an integrated circuit that is intended to securely store the international mobile subscriber identity (IMSI) number and its related key, which may be used to identify and authenticate said network connection interface 114 if adapted to a wireless network of any one of 3G/4G-LTE, cellular, satellite, or other telephony wireless networks or a combination thereof.

Referring to FIG. 5, said image sensor electronic board 105 may further comprise an applications processor 155 to process the raw optical image data from said at least one optical image sensor, wherein said processed optical image data may include subsets of data coming from different modules integrated on the power-supply electronic board 103, the micro-processor electronic board 104, or the image sensor electronic board 105. In one embodiment, the processed optical image data may comprise image compression data, or image stitching data, or streetlight status data, or camera status data, or network connection status data, or registry data, or power supply data, or geolocation data, or time data, or any other data or combination thereof.

Still referring to FIG. 5, there is illustrated a streetlight camera 100 as provided in an exemplary embodiment. The streetlight camera 100 may comprise a temperature-control board 106 linked to a heatsink 107 for controlling the temperature of said streetlight camera. In one embodiment, the temperature control is provided by a Peltier apparatus 116 working from a direct thermoelectric conversion of electric voltage to temperature difference and vice versa via a thermocouple. In one embodiment, the heatsink 107 may exhibit a variety of fin shapes and may extends beyond the physical extent of the streetlight camera housing 101 for a more efficient transfer of heat from inside to outside said camera housing. In one embodiment, the heatsink 107 may be in direct contact with the camera housing 101 in order to regulate the temperature of the housing for de-fogging applications or for maintaining optical transparency of the housing regardless of weather conditions.

Still referring to FIGS. 3, 4 and 5, the streetlight camera 100 may comprise an antenna electronic board 108 comprising an arrangement of at least one radio emitter and receiver antenna. Said electronic board 108 may comprise at least one transmit and at least one receive antenna operating at at least one radio frequency within the range of frequencies from 0.8 to 6 GHz. In one embodiment, the electronic board 108 may comprise multiple antennas operating in the 900 MHz or 2.4, 3.6, 5, 5.8, or 6 GHz radio frequency bands. In one embodiment, the electronic board 108 may comprise multiple antennas having different shapes not limited to: linear shapes, planar shapes, fractal shapes, loop shapes, or other antenna shapes or a combination thereof.

According to an aspect of the invention, the streetlight camera 100 and camera housing 101 may be cylindrically shaped and may comprise at least two optical image sensors arranged at different positions around a lateral cylindrical side-wall of said camera housing for collecting images of a ground area below and to the sides of the streetlight. In one embodiment illustrated in FIG. 6, the streetlight camera [100] of the present invention may be cylindrically shaped externally and comprise a camera housing [101] that may be optically-transparent proximal to the optical image sensors [115] [125]. The cylindrical shape may extend to the electrical connection [102] and may feature a multi-pin connector [122] that may be adapted to a twist-lock type socket in order to mechanically support and electrically connect the streetlight camera to the photodetector switch port. The cylindrical shape may also extend to the heatsink [107] which may include a set of fins vertically- or horizontally-oriented. In another embodiment, at least four said optical image sensors may be arranged in said camera housing to provide a larger field of view of a ground level area proximal to the streetlight.

According to an aspect of the invention, the streetlight camera 100 may be mounted on a given streetlight 110 for obtaining optical data, sensor data, and/or environmental data of the ground level area 120 and of the surrounding areas proximal to the streetlight. The data may be indicative of and not limited to: the presence of vehicles on the roadway proximal to the streetlight; the driving behavior and the facial recognition of passengers of vehicles on the roadway proximal to the streetlight; the presence, the behavior and the facial recognition of pedestrians on the roadway proximal to the streetlight; the general conditions of the roadway or the environment proximal to the streetlight, and the like. For example, the driving behavior information may comprise one or more of: information regarding the speed and direction of a vehicle; information regarding license plate and general condition of a vehicle; information regarding the behavior of a driver; information regarding whether a vehicle stopped at stop signs, stopped at street lights or yielded for pedestrians; information regarding whether any driving infraction may have occurred in violation of a driving law, information regarding the road conditions, and the like. Accordingly, the driving behavior information obtained through the streetlight camera 100 may comprises one or more of: a photo of a vehicle; license plate information of a vehicle; speed of a vehicle; a photo of the driver of a vehicle; a photo of the passenger of a vehicle; a photo of a vehicle at a crosswalk and/or intersection, and the like. The driving infraction may be one or more of: a speeding infraction; a failure to stop at a stop sign infraction; a failure to allow a pedestrian to cross a crosswalk infraction; a seatbelt infraction; a vehicle loading condition infraction, a use of a cell phone infraction; and the like. The information and other types of driving infractions may be determined depending on the practical implementation of the streetlight camera. The streetlight camera 100 may be provided at various types of streetlights 110 and ground level areas 120 proximal to various types of roadways, such as highways, primary arteries, secondary arteries, collector roads, and local roads. The information may comprise information that is not related to roadway conditions or driving behavior. For example, information regarding any type of noteworthy event, such as a mob event, a weather event, a natural disaster, a missing person's tracking event, a criminal event, a terrorist attack, and the like, may be recorded by the streetlight camera or its sensors. According to one aspect of the invention, firmware or software data applications may provide the streetlight camera 100 the ability to execute such surveillance functionalities.

According to an aspect of the invention, the streetlight camera 100 may be mounted on a given streetlight 110 for controlling the light intensity of the streetlight, which may allow real-time and programmed management of its light output, and may deliver maintenance and energy savings through light dimming and lighting optimization. In one embodiment, the streetlight camera 100 may be configured to become a controllable light node, using wired or wireless network communications, which may allow remote control and monitoring of lighting status, levels, programmed scenarios and advanced scheduling. According to an aspect of the invention, the streetlight camera 100 may be used to monitor and control private or municipal assets surrounding the ground level area 120, measure peak consumption of the streetlight and optimize energy resources, signal power failures, schedule repairs, trigger weather-related alarms, provide real-time monitoring, and assist with emergency coordination. These and other aspects of the invention may be captured, recorded, and communicated by the streetlight camera from the set of data encompassed by the optical image data, environmental sensors data, inertial sensors data, streetlight status data, camera status data, network connection status data, registry data, power supply data, geolocation data, time data, or any other data collected by the streetlight camera. According to an aspect of the invention, the streetlight camera 100 may be used to collect and broadcast reliable dynamic information for data applications, and may be configured into an addressable, remotely accessible asset via wireless communication, with capabilities to connect various types of sensors for control, sensing, monitoring and metering to a data management system. According to one aspect of the invention, firmware or software control applications may provide the streetlight camera 100 the ability to execute such lighting control functionalities.

According to an aspect of the invention, the streetlight camera 100 may be mounted on a given streetlight 110 and configured according to the geolocation data of said streetlight, or to the civic address data of said streetlight, or to the internet protocol address data of said streetlight, or to the media access control address data of said streetlight, or to the memory address data of said streetlight, or to any physical or logical addresses data of said streetlight or to a combination thereof. In one embodiment, the streetlight camera 100 may be configured according to the geolocation data provided by the Global Positioning System (GPS) sensor 134 on the micro-processor electronic board 104. Since the streetlight camera 100 of the present invention may be configured as an addressable, remotely accessible device, the geolocation data provided by the Global Positioning System (GPS) sensor 134 may be used as an address for the purpose of streetlight camera auto-configuration. As used herein, the term 'auto-configuration' is intended to refer to the automatic configuration of devices without manual intervention, without any need for software configuration programs. In one embodiment, the streetlight camera 100 may comprise an image sensor electronic board 105 comprising a memory unit 165 to store and register the configuration address of said streetlight camera, wherein said configuration address refers to the geolocation data provided by the Global Positioning System (GPS) sensor 134. As used herein, the term 'geolocation data' is intended to refer to a location on the Earth's surface, and may be expressed as a geographic location consisting of longitude, latitude or altitude coordinates, or a combination thereof. According to one aspect of the invention, firmware or software configuration applications may provide the streetlight camera 100 the ability to execute such auto-configuration functionalities. In one embodiment, the memory unit 165 may comprise a programmable registry wherein the address information refers to the geolocation data of the streetlight camera. As used herein, the term 'registry' is intended to refer to a database of addresses and associated registrant information.

In other embodiments, the memory unit 165 may comprise a programmable registry wherein the address information refers to the geolocation data of said streetlight, or to the civic address data of said streetlight, or to the internet protocol address data of said streetlight, or to the media access control address data of said streetlight, or to the memory address data of said streetlight, or to any physical or logical addresses data of said streetlight or to a combination thereof. In other embodiments, the memory unit 165 may comprise a programmable registry wherein the address information refers to the geolocation data of a plurality of network-connected streetlights, or to the civic address data of a plurality of network-connected streetlights, or to the internet protocol address data of a plurality of network-connected streetlights, or to the media access control address data of a plurality of network-connected streetlights, or to the memory address data of a plurality of network-connected streetlights, or to any physical or logical addresses data of a plurality of network-connected streetlights or to a combination thereof.

According to an aspect of the invention, and referring to FIG. 5, the streetlight camera 100 may comprise a microprocessor electronic board 104 comprising a network connection interface 114 to send and receive communication data through a wired or wireless communications network. The micro-processor electronic board 104 may further comprise a message manager program adapted to receive an incoming message via the network connection interface 114 and to handle the incoming message in accordance with a content of the incoming message and the registry, wherein, upon receipt of an incoming message, the microcontroller integrated circuit 124 is adapted to retrieve raw or processed optical image data from the memory unit 165 and send optical image data through the network connection interface 114. Said message manager program may provide the ability of addressability to the streetlight camera 100, wherein the term 'addressability' is intended to refer to the ability of a digital device to individually respond to a message sent by the communications network or sent by one or many similar network-connected devices. Said incoming message is intended to refer to elements in communication or computer networks where firmware or software applications communicate by exchanging formally-defined digital messages. Said incoming message may provide a set of instructions to the streetlight camera 100 for validating, storing, transforming, routing, retrieving, or responding to any data gathered by the streetlight camera 100 or transmitted by the communications network. In one embodiment, said network connection interface 114 is adapted to form a network among similar said network connection interface from neighboring streetlight cameras; such network may comprise 915 MHz or LoRa long-range radio links for communicating a message wherein, upon receipt of the message, the microprocessor electronic board 104 is adapted to retrieve the operation status data (light output, power levels, sensor data, etc.) of the streetlight 100, and send said operation status data through the wireless network communications interface using 915 MHz or LoRa long-range radio transmitters for communicating said data to the wireless network, or using 4G-LTE cellular gateway radio links for communicating said data to an IP network. In one embodiment, said network connection interface 114 is adapted to form a network among similar said network connection interface from neighboring streetlight cameras; such network may comprise 915 MHz or LoRa long-range radio links for communicating a message wherein, upon receipt of the message, the micro-processor electronic board 104 is adapted to retrieve the optical image data from the memory unit 165, and send said optical image data through the wireless network communications interface using WiFi or UWB daisy-chained short-range radio links for communicating said optical data to the wireless network, or using 4G-LTE cellular gateway radio links for communicating said optical data to an IP network. According to one aspect of the invention, firmware or software addressability applications may provide the streetlight camera 100 the ability to execute such addressability functionalities.

According to an aspect of the invention, and referring to FIGS. 5, 6, 7, 8 and 9, the streetlight camera 100 may comprise a micro-processor electronic board 104 comprising a network connection interface 114 to send and receive communication data through a plurality of wired or wireless communications networks, wherein said streetlight camera 100 forms a physical node coincident simultaneously with the nodes of said plurality of wired or wireless networks of different topologies, and wherein said network connection interface 114 is configured to broadcast said data through any of said plurality of wired or wireless networks upon receipt of an incoming message. As used herein, the term 'node' is intended to refer to a localized point of intersection, or a point in a network topology where lines intersect or terminate. In some embodiments, said streetlight camera 100 comprises an antenna electronic board 108 comprising an arrangement of at least three radio emitter and receiver antennas, wherein said streetlight camera 100 forms a physical node coincident simultaneously with the nodes of at least three wireless networks of any one of wireless cellular networks, wireless metropolitan area networks, wireless wide area networks, wireless global area networks, wireless personal area networks, wireless local area networks, or any other wireless communications networks, and wherein said network connection interface 114 may comprise at least three radio emitters and receivers in any one of the 900 MHz and 2.4, 3.6, 5, 5.8, and 6 GHz radio frequency bands. Said plurality of wired or wireless communications networks may comprise networks of different topologies consisting of physical topologies, or logical topologies, or a combination thereof. Said plurality of wired or wireless communications networks may comprise networks of different topologies wherein said topologies may further comprise mesh, partially connected mesh, fully connected mesh, ring, dual ring, star, extended star, line, tree, bus, hybrid topologies, or any other network topologies or a combination thereof. As used herein, the term 'topology' is intended to refer to the spatial arrangement of the elements (links, nodes, etc.) of a communication network. In some embodiments, said network connection interface 114 may be adapted to send and receive communication data through a plurality of wireless networks of any one of WiFi, Bluetooth, UWB, LoRa, LTE, cellular, satellite, or other wireless networks or a combination thereof. In some embodiments, wireless network communications interface 114 is adapted to form a network node among similar said wireless network communications interfaces from neighboring streetlight cameras; such network node may comprise 915 MHz long-range radio links for communicating the operation status data (light output, power levels, sensor data, etc.) of the streetlight, and may comprise UWB short-range radio links for communicating optical data (still photographs, video streaming, etc.) of the streetlight, and may comprise 4G-LTE cellular gateway radio links for communicating data to an IP network. According to one aspect of the invention, firmware or software network applications may provide the streetlight camera 100 the ability to execute such communications networking functionalities.

In some embodiments, said streetlight camera 100 comprises an antenna electronic board 108 comprising an arrangement of at least three radio emitter and receiver antennas operating at different radio frequencies within the range of frequencies from 0.8 to 6 GHz, wherein said streetlight camera 100 forms a physical node coincident simultaneously with the nodes of at least three wireless networks of different topologies serving a network of similar neighboring streetlight cameras; such network node may comprise 915 MHz or LoRa long-range radio links for communicating the operation status data (light output, power levels, sensor data, etc.) of the streetlight, and may comprise WiFi or UWB short-range radio links for communicating optical data (still photographs, video streaming, etc.) of the streetlight, and may comprise 4G-LTE cellular gateway radio links for communicating data to an IP network.

According to an aspect of the invention, the streetlight camera 100 may be network-connected to a plurality of similar streetlight cameras, each forming a physical node in a communications network. In one embodiment, and referring to FIG. 7, streetlight camera numbered 1 [100] may form a physical node coincident simultaneously with one of the nodes of a mesh wireless network [200], and with one of the nodes of a star wireless network [300], and with one of the nodes of a line wireless network [400]. In another embodiment, and referring to FIG. 8, streetlight camera numbered 1 [100] may form a physical node coincident simultaneously with one of the nodes of a mesh wireless network [200], and with one of the nodes of a star wireless network [300], and with one of the nodes of a line wireless network [400]; and streetlight optical device numbered 3 [100] may form a physical node coincident simultaneously with one of the nodes of a mesh wireless network [200], and with one of the nodes of a local-area star wireless network [500], and with one of the nodes of a wide-area star wireless network [600]. In another embodiment, and referring to FIG. 9, streetlight camera numbered 3 [100] may form a physical node coincident simultaneously with one of the nodes of a mesh wireless network [200], and with one of the nodes of a local-area star wireless network [500], and with one of the nodes of a wide-area star wireless network [600], and streetlight optical devices numbered 10 and 11 may form physical nodes coincident simultaneously with the nodes of a mesh wireless network [200], and with the nodes of a wide-area star wireless network [600], and with the nodes of a bus wireless network [700].

Figure 10:
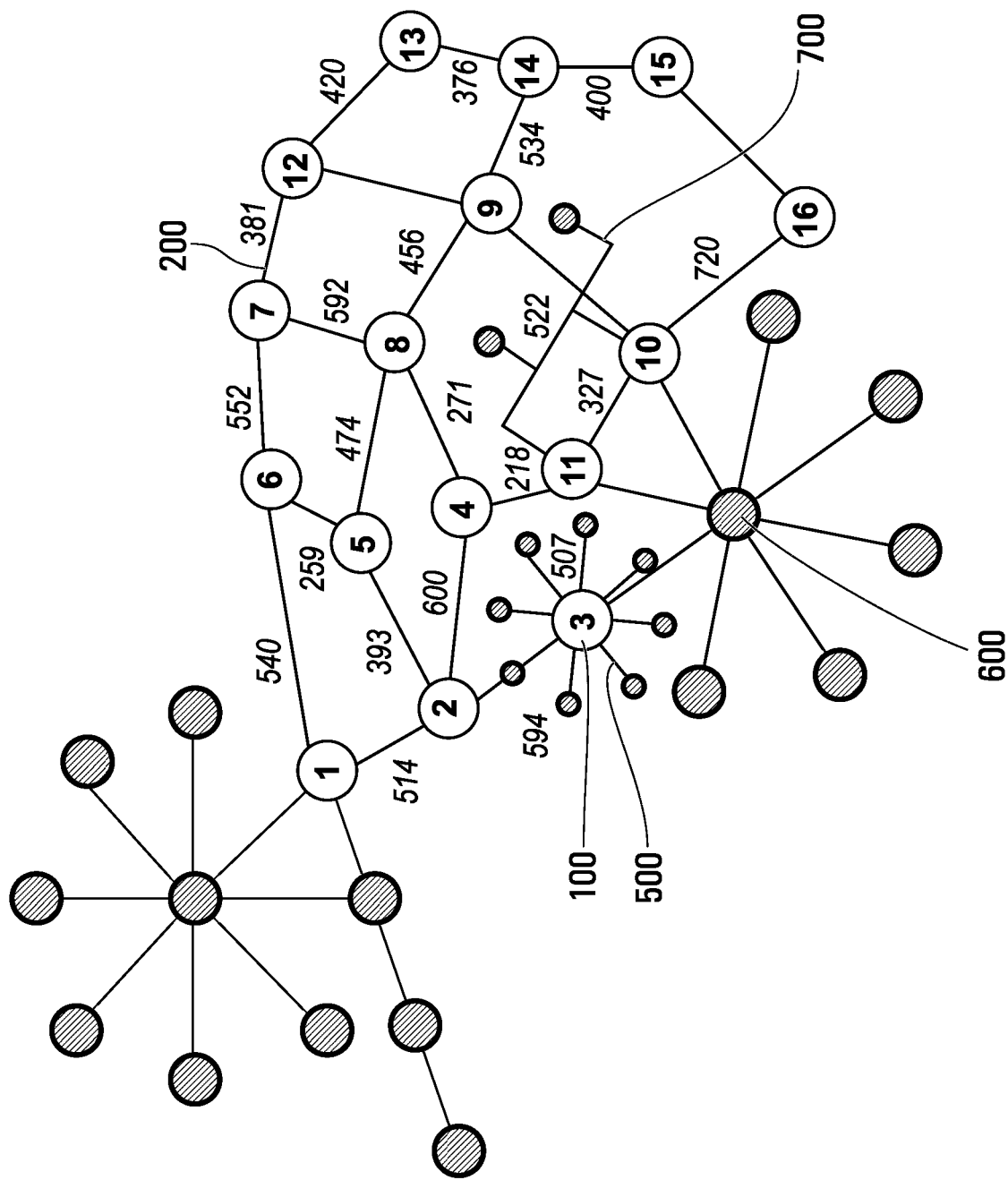
FIG. 10: Streetlight cameras of the present invention (numbered from 1 to 16), wherein said streetlight cameras form physical nodes coincident simultaneously with the nodes of a plurality of wireless communications networks of different topologies. In this embodiment, streetlight camera numbered 3 [100] forms a physical node coincident simultaneously with one of the nodes of a mesh wireless network [200], with one of the nodes of a local-area star wireless network [500], and with one of the nodes of a wide-area star wireless network [600], and streetlight camera numbered 10 and 11 form physical nodes coincident simultaneously with the nodes of a mesh wireless network [200], with the nodes of a wide-area star wireless network [600], and with the nodes of a bus wireless network [700].
Figure 11:
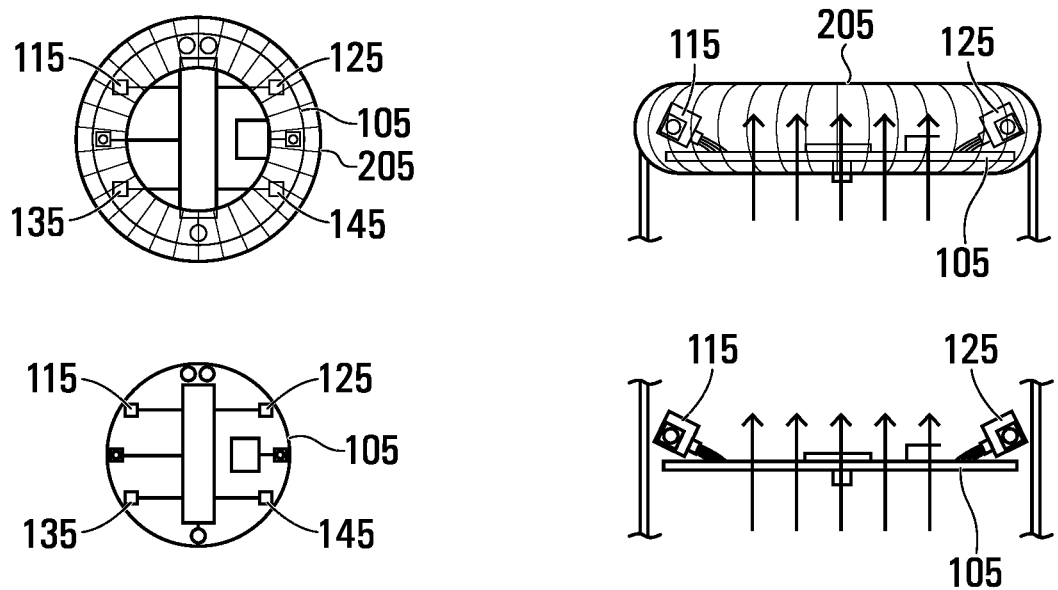
FIG. 11: Streetlight camera of the present invention (vertical and cross-section views) comprising an image sensor electronic board [105] and comprising at least two optical image sensors and lens arrangements [115] [125] [135] [145] on said electronic board, wherein said arrangements provide a wide angle panoramic imagery forming a polyhedron field of view [205] of the surrounding the ground level area proximal to said streetlight, and wherein each of said optical image sensors and lens arrangements [115] [125] [135] [145] is aligned toward a different polyhedral section of said polyhedron field of view [205].
Figure 12:
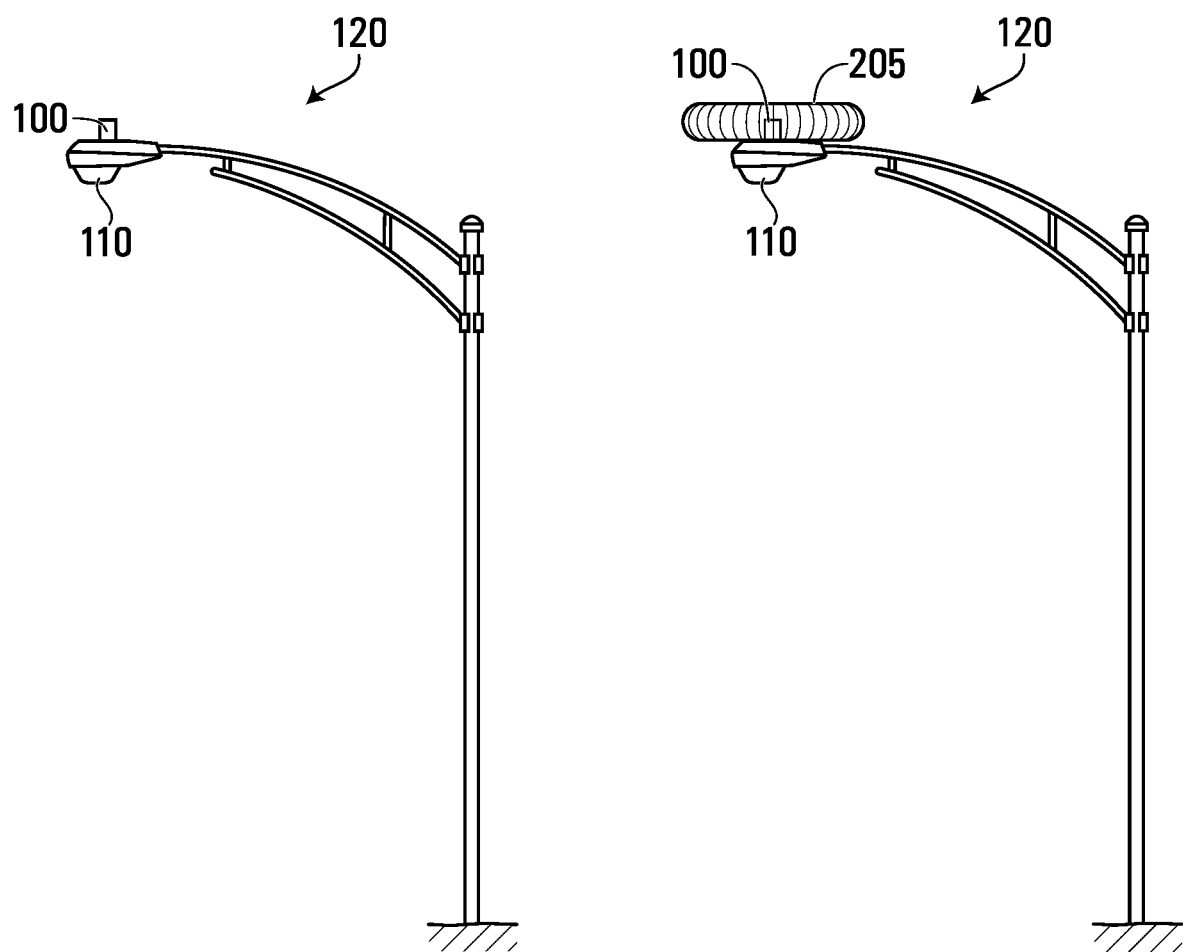
FIG. 12: Streetlight camera [100] of the present invention comprising at least two optical image sensors and lens arrangements, wherein said arrangements provide a wide angle panoramic imagery forming a polyhedron field of view [205] of the surrounding the ground level area [120] proximal to said streetlight [110], and wherein each of said optical image sensors and lens arrangements is aligned toward a different polyhedral section of said polyhedron field of view [205].

According to an aspect of the invention, and referring to FIGS. 10 and 11, the streetlight camera 100 may comprise an image sensor electronic board 105 comprising at least two optical image sensors and lens arrangements 115 125 135 145, and may be mounted on a given streetlight 110 and may be used for panoramic imagery of private or municipal assets surrounding the ground level area 120. Said at least two optical image sensors and lens arrangements 115 125 135 145 may be configured to provide at least two field of views of a ground level area proximal to the streetlight, wherein each of said optical image sensors is aligned toward a different field of view of the ground level area 120, such as to provide a wide angle panorama of the ground level area 120. As used herein, the term 'panorama' is intended to refer to a wide-angle view or representation of a physical space. According to an aspect of the invention, said at least two optical image sensors and lens arrangements 115 125 135

145 may be aligned toward different fields of view of the ground level area 120, and the optical data may be processed and stitched by the applications processor 155 in such a manner as to provide a wide angle panoramic imagery forming a polyhedron field of view 205 of the surrounding the ground level area 120 proximal to said streetlight 110, wherein each of said optical image sensors and lens arrangements is aligned toward a different polyhedral section of said polyhedron field of view 205. In one embodiment, said optical image sensors and lens arrangements 115 125 135 145 may be configured in a circular arrangement around the axis of said image sensor electronic board 105, wherein said circular arrangement provide a toroidal polyhedron field of view of the surrounding the ground level area 120. According to one aspect of the invention, firmware or software imagery applications may provide the streetlight camera 100 the ability to execute such panoramic imagery functionalities.

According to an aspect of the invention, the streetlight camera 100 may be for use with a streetlight of the type having a photodetector switch port on a housing of said streetlight, the streetlight camera comprising a camera housing; a mounting socket configured to connect to said port for mechanically supporting said housing; a power supply for receiving power from photodetector switch port of said streetlight; and at least one optical image sensor and lens arrangement mounted in said camera housing. Said streetlight camera may further comprise a wireless network communications interface adapted to communicate optical image data from said at least one optical image sensor, wherein said wireless data communications interface is adapted to form a network among similar said wireless network communications interfaces from neighboring streetlight cameras. Said streetlight camera may provide lighting control applications, or surveillance applications, or auto configuration applications, or addressability applications, or communications networking applications, or panoramic imagery applications, or a combination thereof.

According to an aspect of the invention, the streetlight camera 100 may comprise at least one optical image sensor and lens arrangement; a memory unit to store optical image data from said at least one optical image sensor; a microcontroller unit to process optical image data; and a wireless network communications interface to communicate said optical image data, said wireless network communications interface being adapted to form a network among similar said wireless network communications interfaces from neighboring streetlight cameras. Said streetlight camera may further comprise: a message manager adapted to receive an incoming message via the wireless network communications interface and to handle the incoming message in accordance with a content of the incoming message, wherein, upon receipt of an incoming message, the microcontroller unit is adapted to retrieve processed optical image data from the memory unit and send optical image data through the wireless network communications interface. Said streetlight camera may further comprise a registry comprising the geolocation data of said streetlight, wherein said message manager is adapted to receive an incoming message via the wireless data communications interface and to handle the incoming message in accordance with a content of the incoming message and the registry. Said streetlight camera may provide surveillance applications, or auto configuration applications, or addressability applications, or communications networking applications, or panoramic imagery applications, or a combination thereof.

According to an aspect of the invention, the streetlight camera 100 may provide lighting control applications, or surveillance applications, or auto configuration applications, or addressability applications, or communications networking applications, or panoramic imagery applications, or a combination thereof, wherein said applications may be mediated through Web-based user interfaces or web user interfaces (WUI) that collects streetlight data input from the wireless communications networks and provide streetlight control output to the wireless communications networks from an IP address, and may be viewed by a user using a web browser program.

The present disclosure may be embodied in other specific forms without departing from the subject matter of the claims. Also, one skilled in the relevant arts will appreciate that while the streetlight camera device disclosed and shown herein may comprise a specific number of elements/components, the device may be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

The invention claimed is:

1. In combination, a streetlight of the type having a photodetector switch port on a housing of said streetlight located on an opposed upper surface of the streetlight housing above a light source of the streetlight, and a streetlight camera, the streetlight camera comprising:
   a camera housing;
   a connector mounted to a bottom of said camera housing and connected to said port for mechanically supporting said camera housing;
   a power supply for receiving power from said photodetector switch port of said streetlight;
   at least two optical image sensors and lens arrangements mounted in said camera housing and arranged at different positions around a lateral sidewall of said camera housing for collecting images of at least two fields of view of a ground area below and to the sides of said streetlight housing, wherein each of said optical image sensors is aligned toward a different field of view and an image processing unit is operable to stitch together said collected images to provide a wide angle panorama of said ground area below and to the sides of the streetlight.

2. The camera of claim 1, wherein said power supply comprises a switch for controlling operation of said streetlight.

3. The camera of claim 2, wherein said optical image sensor comprises video image sensor, or infrared image sensor, or photo-detecting sensor, or a combination thereof.

4. The camera of claim 1, further comprising a wireless network communications interface adapted to communicate optical image data from said at least one optical image sensor.

5. The camera of claim 4, wherein said wireless network communications interface is adapted to form a network among similar said wireless network communications interfaces from neighboring streetlight cameras.

6. The camera of claim 1, wherein said camera housing is cylindrically shaped.

7. The camera of claim 6, wherein at least four said optical image sensors are arranged in said camera housing.

8. The camera of claim 1, wherein said at least one optical image sensor and lens arrangement provides a polyhedron field of view of a ground level area proximal to the streetlight.

9. The camera of claim 5, further comprising:
a message manager adapted to receive an incoming message via the wireless network communications interface and to handle the incoming message in accordance with a content of the incoming message, wherein, upon receipt of an incoming message, the microcontroller unit is adapted to retrieve processed optical image data from the memory unit and send optical image data through the wireless network communications interface.

10. The camera of claim 9, wherein said incoming message comprises Global Positioning System geolocation data.

11. The camera of claim 9, further comprising a registry comprising the geolocation data of said streetlight, wherein said message manager is adapted to receive an incoming message via the wireless network communications interface and to handle the incoming message in accordance with a content of the incoming message and the registry.

12. The camera of claim 5, wherein said wireless network communications interface is adapted to wireless network topologies comprising mesh, partially connected mesh, fully connected mesh, ring, dual ring, star, extended star, line, tree, bus, hybrid topologies, or any other network topologies or a combination thereof.

13. The camera of claim 12, wherein said wireless network communications interface is adapted to form a network among similar said wireless network communications interfaces from neighboring streetlight cameras.

14. The camera of claim 13, wherein said wireless network communications interface comprises multiple transmit and receive antennas operating at different radio frequencies within the range of frequencies from 0.8 to 6 GHz.

15. The camera of claim 1, wherein said streetlight camera to provide lighting control applications, or surveillance applications, or auto configuration applications, or addressability applications, or communications networking applications, or panoramic imagery applications, or a combination thereof.

16. The camera of claim 15, wherein said applications are mediated through Web-based user interfaces.

17. The camera of claim 5, wherein said streetlight camera to provide lighting control applications, or surveillance applications, or auto configuration applications, or addressability applications, or communications networking applications, or panoramic imagery applications, or a combination thereof.

18. A streetlight camera comprising:
a housing having a base including a plug extending downwardly from the base for connecting to a photodetector socket of a streetlight, a sidewall extending upwardly from the base and having a circular horizontal cross-section and a top;
at least two apertures on an upper part of said sidewall, said apertures having optically-transparent covers protruding from said sidewall of said housing and arranged at different horizontal orientations for collecting images of at least two different fields of view below and to the sides of said streetlight through said optically-transparent covers and said apertures;
at least two optical image sensors and lens arrangements mounted in said housing to image a ground below said streetlight through said optically-transparent covers;
a power supply mounted in a bottom part of said housing and connected to said plug;
a heat sink associated at least with said power supply and connected to said sidewall.

19. The camera of claim 18, wherein said heat sink has fins protruding out of said lateral sidewall.

20. The camera of claim 18, further comprising an image processing unit operable to stitch together images collected by each of said optical image sensors aligned toward said different fields of view to provide a wide angle panorama of said below and said sides of said streetlight.

* * * * *